US011869464B2

(12) United States Patent
Harrit et al.

(10) Patent No.: US 11,869,464 B2
(45) Date of Patent: Jan. 9, 2024

(54) APPARATUS FOR MOUNTING MUSICAL INSTRUMENTS

(71) Applicants: Thomas Harrit, Birkerød (DK); Nicolai Sørensen, Espergærde (DK)

(72) Inventors: Thomas Harrit, Birkerød (DK); Nicolai Sørensen, Espergærde (DK)

( * ) Notice: Subject to any disclaimer, the term of this patent is extended or adjusted under 35 U.S.C. 154(b) by 0 days.

(21) Appl. No.: 17/402,974

(22) Filed: Aug. 16, 2021

(65) Prior Publication Data

US 2022/0246119 A1 Aug. 4, 2022

Related U.S. Application Data

(60) Provisional application No. 63/039,558, filed on Jun. 16, 2020.

(51) Int. Cl.
*G10G 5/00* (2006.01)

(52) U.S. Cl.
CPC .................................... *G10G 5/00* (2013.01)

(58) Field of Classification Search
CPC . G10G 5/00; G10G 5/005; G10G 7/00; A47L 13/51; A47L 13/512; F16B 45/00; F16M 13/02; G10D 1/08; A47G 23/0225
USPC ........... 84/327; 248/443, 110, 111, 113, 312, 248/314, 341; D6/682; D8/373
See application file for complete search history.

(56) References Cited

U.S. PATENT DOCUMENTS

| | | | | |
|---|---|---|---|---|
| D263,906 | S * | 4/1982 | Ormond | G10D 3/00 D8/373 |
| 4,372,468 | A * | 2/1983 | Harvey | A45F 5/02 224/904 |
| 5,165,634 | A * | 11/1992 | Garbuzov | F16M 11/38 84/327 |
| 5,301,823 | A | 4/1994 | Kingery | |
| 5,342,009 | A * | 8/1994 | Lehner | A47G 23/0225 248/311.2 |
| 5,346,168 | A * | 9/1994 | Astrella | A45C 15/00 248/113 |
| 6,619,607 | B2 * | 9/2003 | Yamada | B60N 3/102 248/282.1 |
| 6,951,289 | B2 * | 10/2005 | Scott, Jr. | A47B 81/005 211/64 |
| 7,208,666 | B2 * | 4/2007 | Burch | G10G 5/00 248/653 |
| 7,259,310 | B2 | 8/2007 | Wilfer | |

(Continued)

*Primary Examiner* — Jonathan Liu
*Assistant Examiner* — Guang H Guan

(57) ABSTRACT

An apparatus for mounting musical instruments is disclosed. The apparatus may comprise a backplate fastened to a wall. A front portion of the backplate may comprise a pair of vertically positioned elevated guides. A bridge member having a top end and a bottom end may pivotably connect the backplate to a bracket. A cushioning member having a U-shaped opening for mounting the musical instruments may encase the bracket. A pair of grooves may be provided at a bottom portion of the cushioning member abutting the elevated guides of the backplate and allowing vertical translation of the cushioning member in accordance with the movement of the bracket and the bridge member. An encasing shaped like the cushioning member may be connected to a front portion of the cushioning member. The musical instruments may be mounted by their necks within the U-shaped opening of the cushioning member and the encasing.

12 Claims, 15 Drawing Sheets

900

1000

(56) References Cited

U.S. PATENT DOCUMENTS

| | | | | |
|---|---|---|---|---|
| 7,537,189 | B2 * | 5/2009 | Jung | F16M 11/10<br>248/920 |
| 7,541,529 | B1 * | 6/2009 | Blair | G10G 5/00<br>248/302 |
| 7,546,990 | B1 * | 6/2009 | McGuire | B25H 3/04<br>248/113 |
| 7,547,835 | B1 * | 6/2009 | Mayor | G10G 5/00<br>84/327 |
| 7,579,537 | B2 | 6/2009 | Lippert | |
| 7,659,468 | B1 * | 2/2010 | Gottlieb | G10G 5/00<br>248/443 |
| 7,772,471 | B2 * | 8/2010 | Bustamante | G10G 5/00<br>84/327 |
| 7,906,717 | B2 * | 3/2011 | Wang | G10G 5/00<br>84/327 |
| 8,424,817 | B1 * | 4/2013 | Chen | B25H 3/00<br>248/113 |
| 8,490,942 | B1 * | 7/2013 | Henry | G10G 5/00<br>248/443 |
| 8,573,553 | B2 * | 11/2013 | Stephan | B60N 3/102<br>211/80 |
| 8,590,524 | B2 * | 11/2013 | Ducate, Jr. | A47J 37/0786<br>220/737 |
| 8,763,961 | B1 * | 7/2014 | Yang | G10G 5/00<br>248/176.1 |
| 9,564,111 | B2 * | 2/2017 | Hankins | G10G 5/00 |
| 9,607,592 | B2 | 3/2017 | Chen | |
| 10,272,812 | B2 * | 4/2019 | Ghannam | B60N 3/102 |
| 10,332,493 | B2 * | 6/2019 | Moberg | G10G 5/00 |
| 10,631,634 | B1 * | 4/2020 | Pierce | A47G 23/0225 |
| 10,995,900 | B2 * | 5/2021 | He | F16M 11/247 |
| 2022/0130358 | A1 * | 4/2022 | Goelsdorf | G10D 3/00 |
| 2022/0246119 | A1 * | 8/2022 | Harrit | G10G 5/00 |

* cited by examiner

APPARATUS FOR MOUNTING MUSICAL INSTRUMENTS

CROSS-REFERENCE TO RELATED APPLICATIONS

This application claims the benefit of U.S. Provisional Patent Application Ser. No. 63/039,558, entitled "Apparatus for mounting musical instruments", filed on Jun. 16, 2020, which is incorporated herein in its entirety.

TECHNICAL FIELD

The present invention relates generally to a supporting assembly for musical instruments. More particularly, the present invention is related to a wall mountable hanger for stringed musical instruments having a neck portion.

BACKGROUND

Musical instruments are delicate apparatuses that are to be handled and stored with utmost care. Reckless storage of musical instruments may damage one or more components of the musical instrument thereby affecting the tone and stability of the instrument. More particularly, musical instruments that have a plurality of mechanical components that work together to create a range of tones are more susceptible to damage. For example, storing/resting a stringed musical instrument such as guitars by leaning them against walls may cause wear and tear. Such instruments may get damaged easily in case of a fall. Moreover, the strings may lose tension if the instrument is rested incorrectly. The user may have to tune such instruments regularly to overcome this problem.

Supporting devices such as clips, pins, nails, bolts, clamps, buckles, and a combination of these are commonly used as mounts for supporting musical instruments. Mounting apparatuses may be used to store musical instruments for casual storage or for display at a store. Musical instruments are generally clamped, hung or fastened onto such mounts. While generic mounts may be adapted for storing some musical instruments, they may cause wear and tear to the instrument due to incorrect specification. Since the components of most musical instruments are sensitive in nature, mounting assemblies have to be designed in such a way that the sensitive components are well protected during mounting.

U.S. Pat. No. 9,607,592B2 discloses a guitar hanger apparatus, including a fixed base and a hanger body fixedly connects to the fixed base; the fixed hanger body further includes a fixing holder, applied to support the guitar and move down following the weight of the guitar, a self-locking mechanism connecting to and driven by the fixing holder; the self-locking mechanism comprises rotating shaft assemblies, built in the main body of the hanger, and swing arms connecting to the rotating shaft assemblies; the fixed holder comprises positioning casts, applied to fix the guitar, while a driving unit is arranged in the positioning cast, applied to drive the rotating shaft assemblies. The present invention achieves fixation and protection to a guitar by the weight of the guitar, which has a simple structure, and enables mass production thus brings benefits to the manufacturer.

U.S. Pat. No. 7,259,310B2 discloses a wall holder for at least one musical instrument having a neck or a similar taper, in particular a guitar or bass guitar. The holder includes a mounting which is fastened or can be fastened to the wall and at least two support elements which are arranged on the mounting can be inserted between those of the neck of the musical instrument, the neck and/or the head of the musical instrument abutting against the support elements, and is characterized in that the mounting has at least one guide bar bracket for the support elements via which the support elements can be moved relative to one another.

U.S. Pat. No. 5,301,823A discloses an improved rack for the ornamental display of stringed instruments. The rack mounts against a vertical wall and is fully adjustable thereby accommodating instruments of varying neck widths and head sizes and orientations. The rack is easy to install and use and further is aesthetically pleasing for the ornamental display of stringed instruments on walls in homes, apartments and offices. The rack provides a safe means for storing string instruments while maintaining accessibility of the instrument.

U.S. Pat. No. 7,579,537B2 discloses a device and method for holding an instrument. The holding device includes a housing, at least one holding arm having a mounting section coupled to a holding section through at least one offset lever section, and a resetting device structured and arranged to act eccentrically on the mounting section. The at least one holding arm is rotatable about a longitudinal axis of the mounting section.

The present disclosure proposes a novel mounting device for mounting musical instruments having an extended neck portion such as guitars. The proposed device may be aesthetically pleasing, eco-friendly, and may provide a safe and easy to use solution for securely mounting musical instruments.

SUMMARY OF THE INVENTION

In light of the disadvantages mentioned in the previous section, the following summary is provided to facilitate an understanding of some of the innovative features unique to the present invention and is not intended to be a full description. A full appreciation of the various aspects of the invention can be gained by taking the entire specification and drawings as a whole.

Embodiments disclosed herein described an apparatus for mounting musical instruments with elongated necks. The musical instruments may generally be stringed musical instruments having an elongated neck portion. The primary components of the apparatus include a backplate, a bridge member, a bracket, a cushioning member, an encasing, a back support, a pair of axles and a set of fasteners. The backplate of the apparatus may be fastened to a wall using a set of fasteners. The front portion of the backplate comprises a pair of vertically positioned elevated guides that are parallel to each other. A bridge member having a top end and a bottom end act as a connector between the backplate and a bracket. The top end of the bridge member may be pivotably connected to the elevated guides of the backplate. A first axle pivotably connects the bridge member to the elevated guides. The bottom end of the bridge member is pivotably connected to a bracket using a second axle.

A cushioning member having a U-shaped opening for mounting musical instruments is connected to the bracket. The cushioning member encases the bracket, and the movement of the cushioning member is like that of the bracket. That is, the cushioning member duplicates the movement of the bracket. The cushioning member may be shaped like that of the back plate except for the U-shaped cut-out portion on its upper side. The bottom portion of the cushioning member may comprise a pair of grooves that abuts to the pair of vertically positioned elevated guides of the backplate. This connection allows the bottom portion of the cushioning member to translate vertically in accordance with the movement of the bracket and the bridge member. The movement of the bracket and the cushioning member may be both translational as well as rotational. Further, a back support connected to the front side of the bridge and an encasing shaped like the cushioning member is connected to the front portion of the cushioning member. During operation, musical instruments may be hung by the neck within the U-shaped opening of the cushioning member and the encasement.

This summary is provided merely for purposes of summarizing some example embodiments, to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following detailed description and figures.

The abovementioned embodiments and further variations of the proposed invention are discussed further in the detailed description.

Figure 1A:
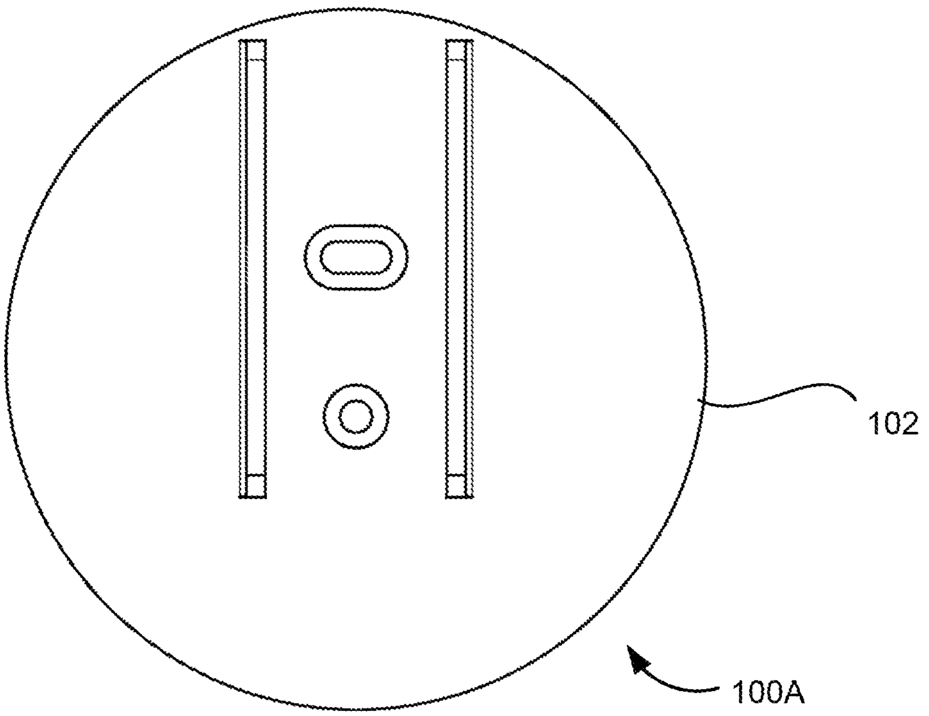
FIG. 1A is an exemplary front view 100A and FIG. 1B is an exemplary perspective view 100B of the backplate of the apparatus for mounting musical instruments according to the embodiments of the present disclosure.

The drawings described herein are for illustration purposes only and are not intended to limit the scope of the present subject matter in any way.

DETAILED DESCRIPTION

In the following description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments maybe utilized and that changes may be made without departing from the scope of the present invention. The following detailed description is, therefore, not to be taken in a limited sense.

The specification may refer to "an", "one" or "some" embodiment(s) in several locations. This does not necessarily imply that each such reference is to the same embodiment (s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments described herein disclose an apparatus that corresponds to a smart exercise mat. The apparatus may be referred to as a "mounting device", "device", "apparatus", "mounting apparatus", or "wall mounting device/apparatus" interchangeably according to the context of the sentence. The terms used herein do not restrict the scope of the present disclosure.

According to the embodiments of the present disclosure, an apparatus for securely storing musical instruments in disclosed. The apparatus may be used for securely hanging/mounting musical instruments such as guitars that have an elongated neck portion. The musical instrument may be hung by their neck portion within an opening/cut-out provided in the apparatus. The apparatus may have an extended configuration and a retracted configuration. When the apparatus is not in use, the apparatus may be retracted to reach a resting configuration. During operation, the apparatus may be reconfigured to an extended position.

The primary components of the apparatus may include a backplate, a bridge member, a bracket, a cushioning member, an encasing, and a plurality of connecting devices such as axles, bolts, and other related fasteners. The backplate of the apparatus may be fastened to a wall using a set of fasteners. The backplate may be fastened onto a wall or any other rigid supporting structure. Apart from walls, the backplate may be fastened onto surfaces such as wooden frames, panels, doors, and the like, as understood by a person skilled in the art. The backplate may be screwed/fastened into walls using nuts, bolts, clasps, or other related fasteners. The backplate may also be glued onto walls using glues with high adhesive strength. Preferably, the backplate maybe screwed onto walls using bolts. The backplate may be provided with one or more openings/slots for using fasteners such as bolts and screws.

The front portion of the backplate may comprise a pair of vertically positioned elevated guides. The guides may be positioned at a fixed distance from each other and may run parallel to each other. The guides may facilitate translation of the bottom portion of the cushioning member in a vertical direction. The working of the elevated guides will be discussed while referring to the working of the cushioning member along with the diagrams for better understanding. A bridge member having a top end and a bottom end may act as a connector between the backplate and a bracket. The top end of the bridge member may be pivotably connected to the elevated guides of the backplate. A first axle may pivotably connect the bridge member to the elevated guides. The bottom end of the bridge member may be pivotably connected to a bracket using a second axle. That is, the bridge member may be pivotably connected to two different components of the apparatus at its top and bottom ends. The movement of the bridge member is restricted to a particular axis. The movement of the bridge translates into the movement of the bracket as well. The top end of the bridge member is fixed pivotably at the top end of the elevated guide. The body of the bridge member rotates along a specific axis with respect to the top end. The bottom end of the bridge member may also be pivotably connected to the bracket using a second axle. The pivotable connection between the bridge member and the bracket may allow the bracket to rotate along a specific axis with respect to the bridge member.

Further, the bracket may be encased by a cushioning member having a U-shaped opening for mounting musical instruments. The cushioning member may have a cutout for accommodating the bracket into it. The cutout may be shaped like that of the bracket. The bracket may be fastened or glued onto the cushioning member. The cushioning member completely encases the bracket, and the movement of the cushioning member is like that of the bracket. Essentially, the cushioning member may also be indirectly connected to the bridge member pivotably via the bracket. Herein, the cushioning member duplicates the movement of the bracket.

The cushioning member may be shaped like that of the backplate except for the U-shaped cut-out portion on its upper side and a cut-out for accommodating the bracket. Furthermore, the bottom portion of the cushioning member may comprise a pair of grooves that abuts to the pair of vertically positioned elevated guides of the backplate. This assembly may allow the bottom portion of the cushioning member to translate vertically in accordance with the movement of the bracket and the bridge member. The movement of the bracket and the cushioning member may be both translational as well as rotational. Further, a back support connected to the front side of the bridge member and an encasing covering the cushioning member (except for the U-shaped cutout) may be connected to the front portion of the cushioning member. During operation, musical instruments may be hung by the neck within the U-shaped opening of the cushioning member and the encasement.

Figure 1B:
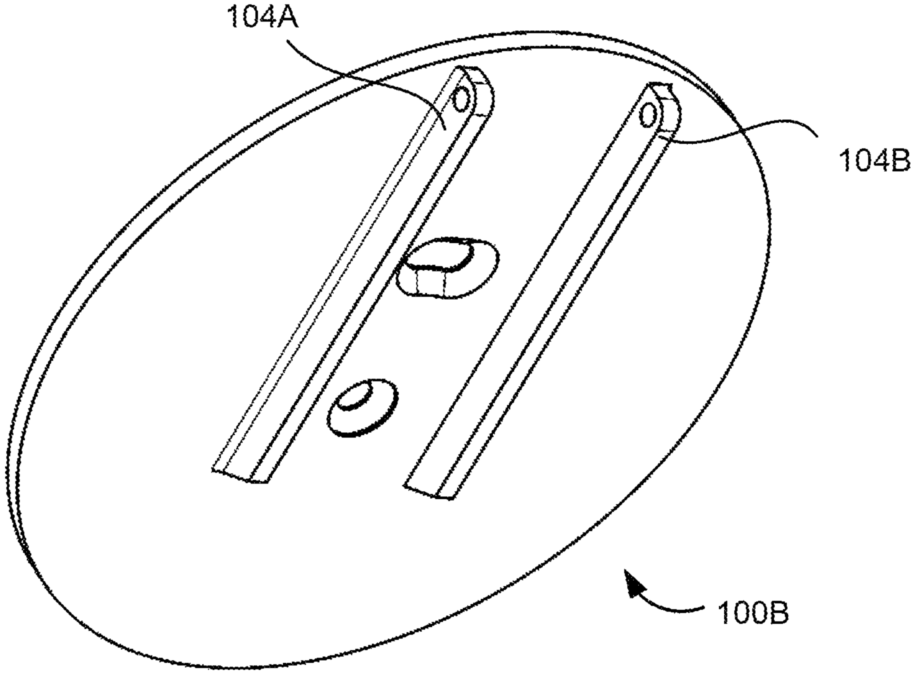

Before moving to the succeeding sections of the this document, it is pertinent to refer to the drawings for a clearer understanding of the invention. Referring to the figures, FIG. 1A is an exemplary front view 100A and FIG. 1B is an exemplary perspective view of the backplate 102 of the apparatus for mounting musical instruments according to the embodiments of the present disclosure. The backplate may comprise one or more openings for facilitating the fastening of the backplate to the wall. The rear portion of the backplate may be plain and may attach to a wall or other related surface. The front portion of the backplate may comprise a pair of parallelly placed vertical elevated guides 104A and 104B. The pair of elevated guides may begin from the top portion of the backplate and may extend towards the lower half as depicted in FIGS. 1A and 1B. The top ends of the guides 104A and 104B may further comprise a small opening for allowing an axle to pass through them. The pair of openings may allow pivotable connection between the backplate and the bridge member.

Figure 2A:
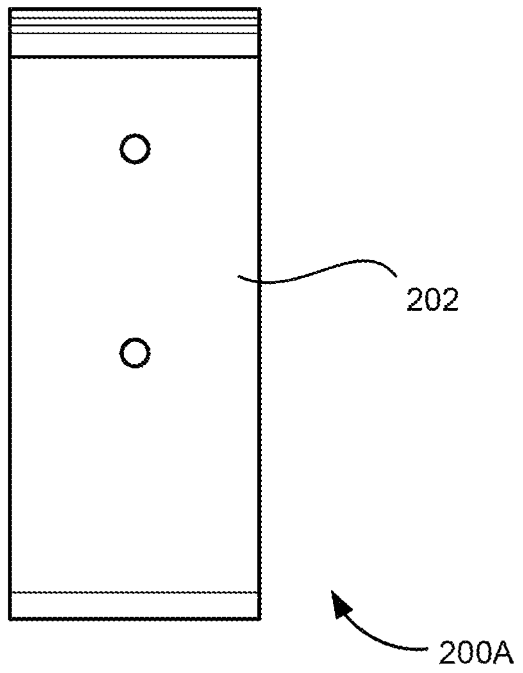
FIG. 2A is an exemplary front view 200A.
Figure 2B:
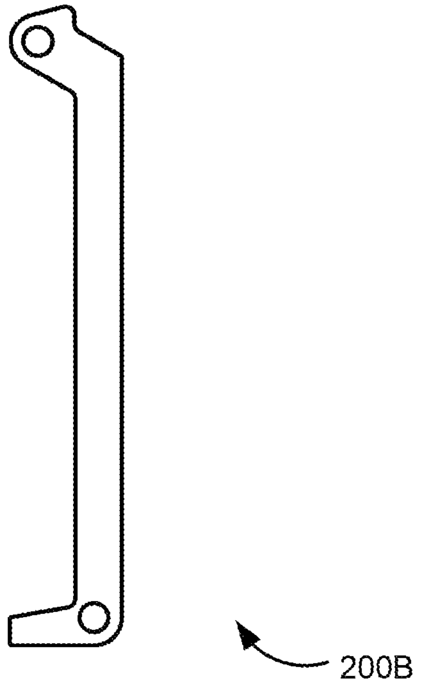
FIG. 2B is an illustrative side view 200B.
Figure 2C:
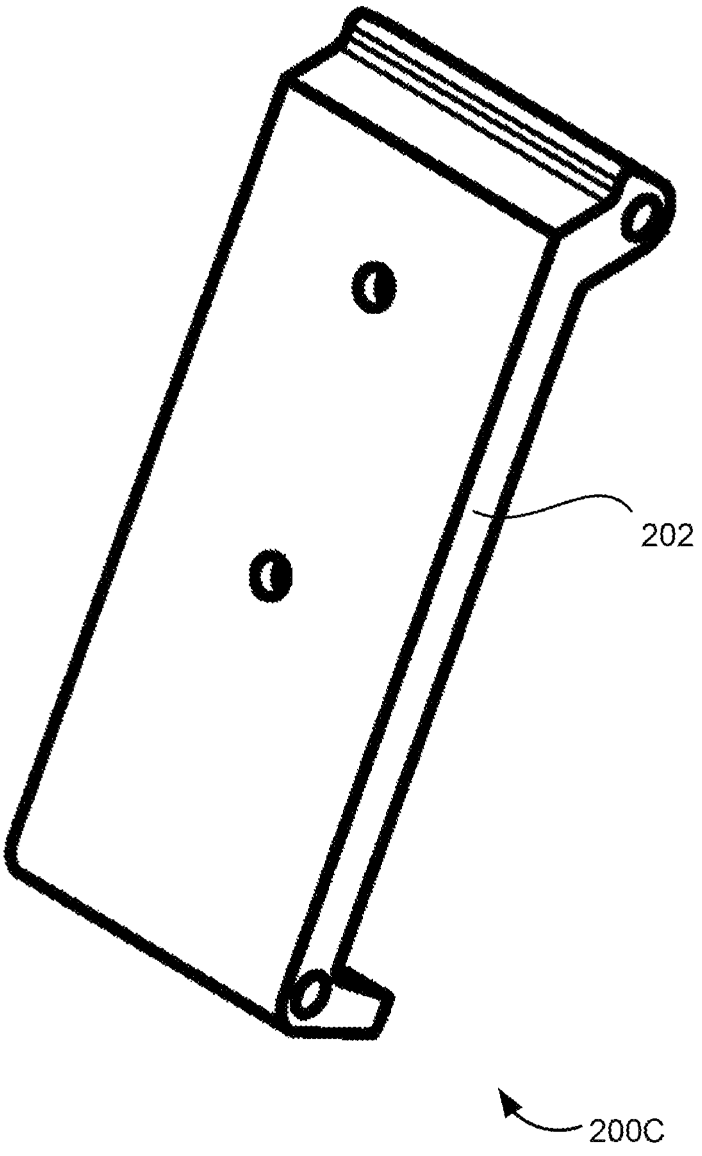
FIG. 2C is an illustrative perspective view 200C of a bridge member of the apparatus for mounting musical instruments according to the embodiments of the present disclosure.

FIG. 2A is an exemplary front view 200A, FIG. 2B is an illustrative side view 200B, and FIG. 2C is an illustrative perspective view 200C of a bridge member 202 of the apparatus for mounting musical instruments according to the embodiments of the present disclosure. The bridge member 202 may have a top end and a bottom end as depicted in the figures. The top and bottom ends may further comprise openings for allowing pivotable connections using axles. Furthermore, the bridge member 202 may include one or more openings on its body for allowing other components to be fastened on its front surface. Herein, a back support may be fastened onto the front surface of the bridge member 202.

Figure 3:
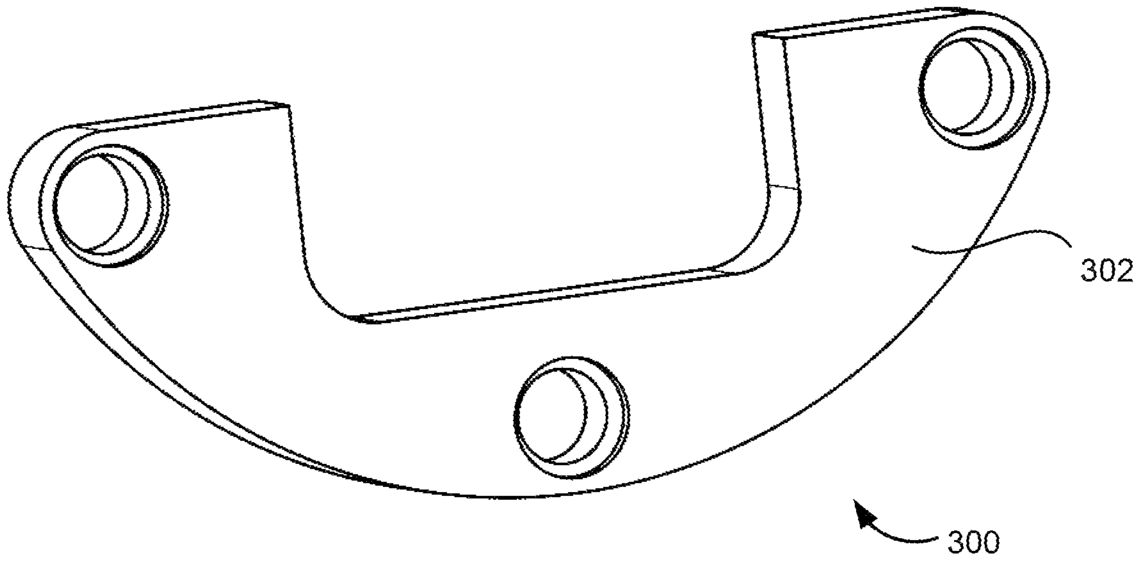
FIG. 3 is an exemplary view 300 of a bracket of the apparatus for mounting musical instruments according to the embodiments of the present disclosure.
Figure 4:
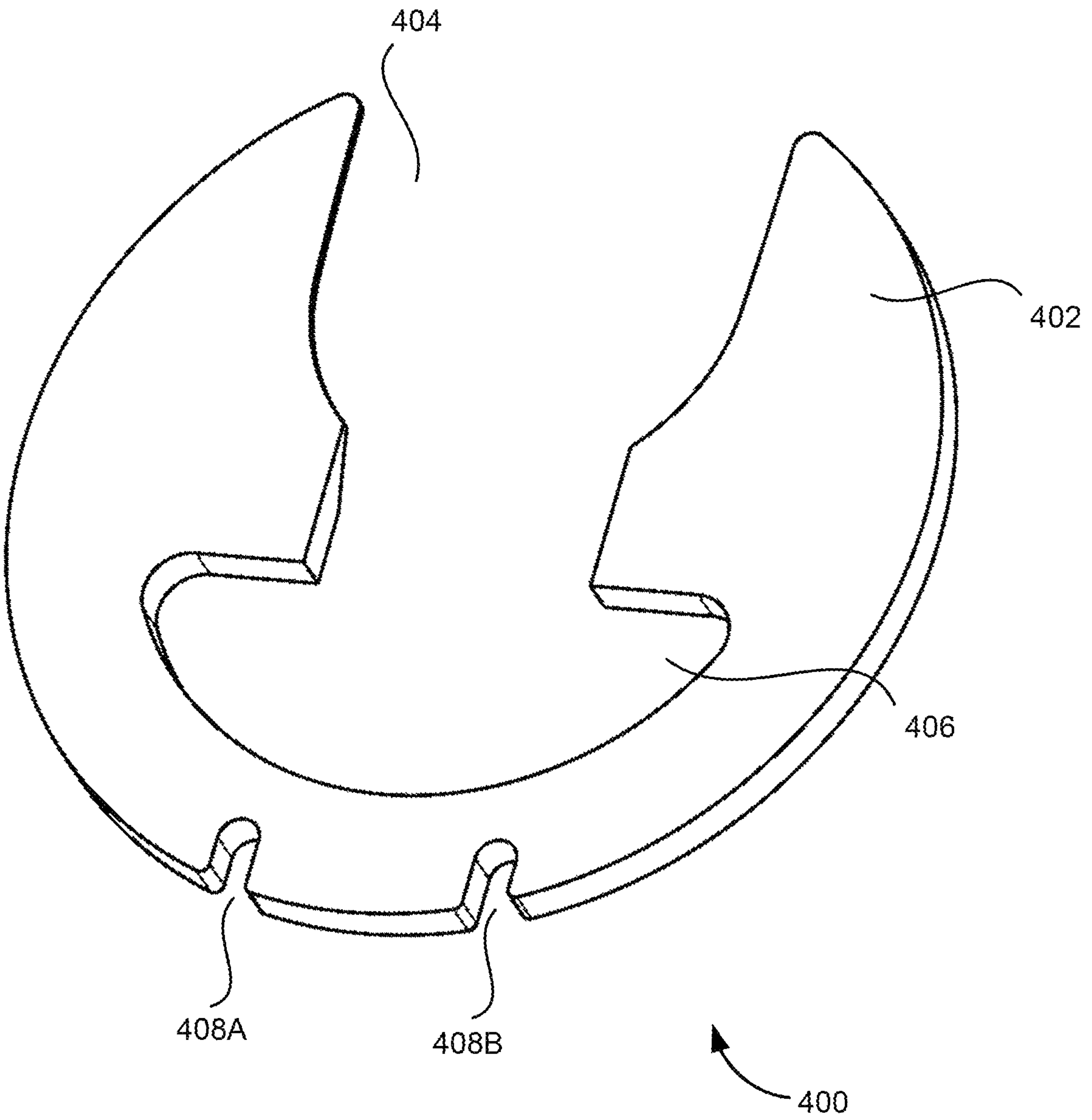
FIG. 4 is an exemplary view 400 of a cushioning member of the apparatus for mounting musical instruments according to the embodiments of the present disclosure.

FIG. 3 is an exemplary view 300 of a bracket of the apparatus for mounting musical instruments according to the embodiments of the present disclosure. The bracket 302 may comprise a series of openings for fastening the bracket onto other components of the apparatus. In one example, the openings may be used to fasten the brackets onto an encasing. The bracket 302 may be pivotably connected to the bridge member 202 and encased within a cushioning member 402. FIG. 4 is an exemplary view 400 of a cushioning member 402 of the apparatus for mounting musical instruments according to the embodiments of the present disclosure. The cushioning member 402 may have similar outer dimensions as that of the backplate 202 except for a series of cut-outs for accommodating various components. The first cut-out may be a U-shaped cut-out 404 at its top portion for accommodating the neck of musical instruments. Below the U-shaped cut-out 404, another cut-out 406 may be provided for accommodating the bridge member 202 and the bracket 302. The bottom portion of the cushioning member 402 may further comprise a pair of grooves 408A and 408B that abuts to the elevated guides 104A and 104B of the backplate 202.

Figure 5:
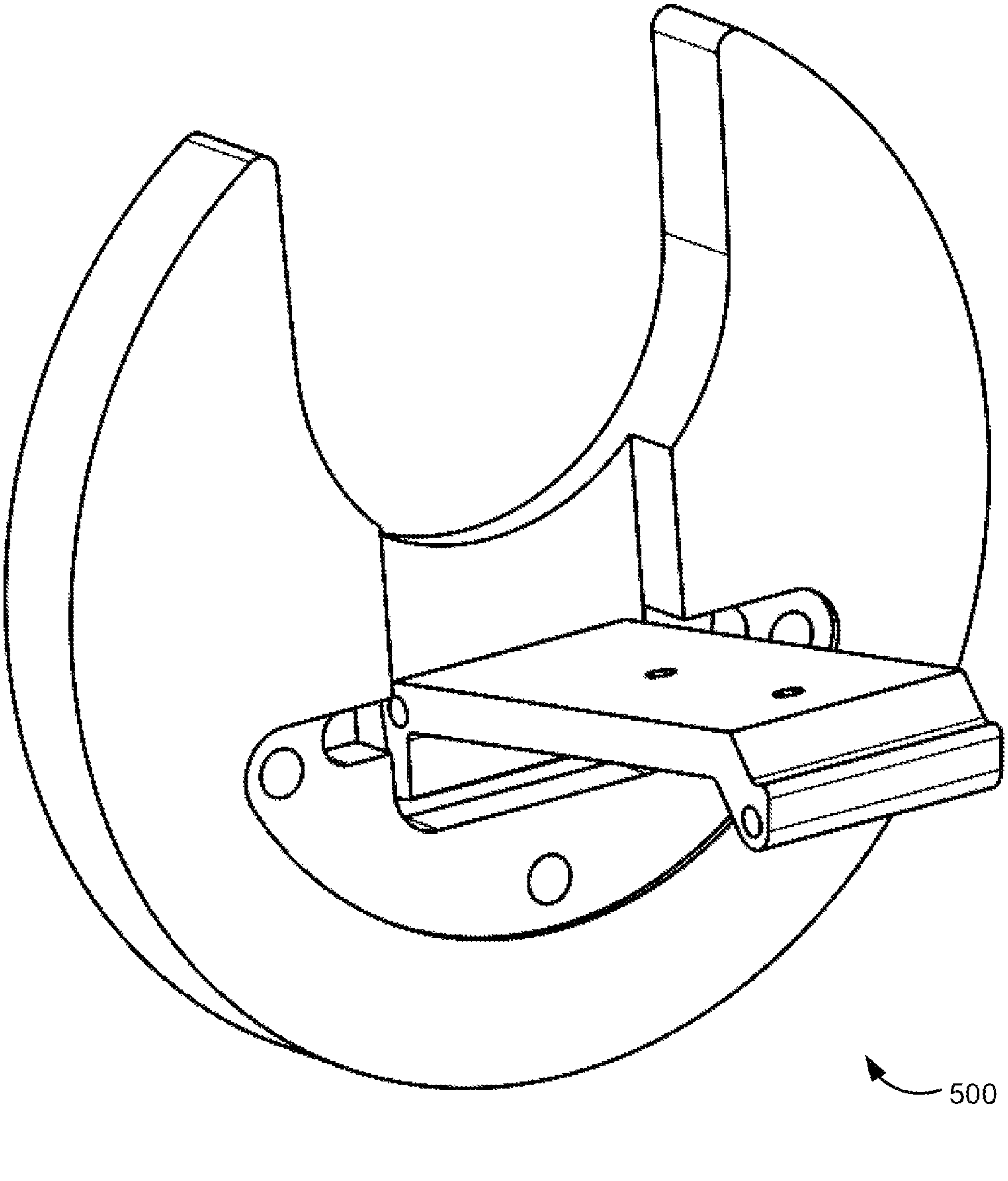
FIG. 5 is an exemplary view 500 of the cushioning member of FIG. 4 connected to the bracket of FIG. 4 and bridge member of FIG. 2C of the apparatus for mounting musical instruments according to the embodiments of the present disclosure.

FIG. 5 is an exemplary view 500 of the bridge member (202) and an encasing (702) according to the embodiments of the present disclosure.

Figure 6:
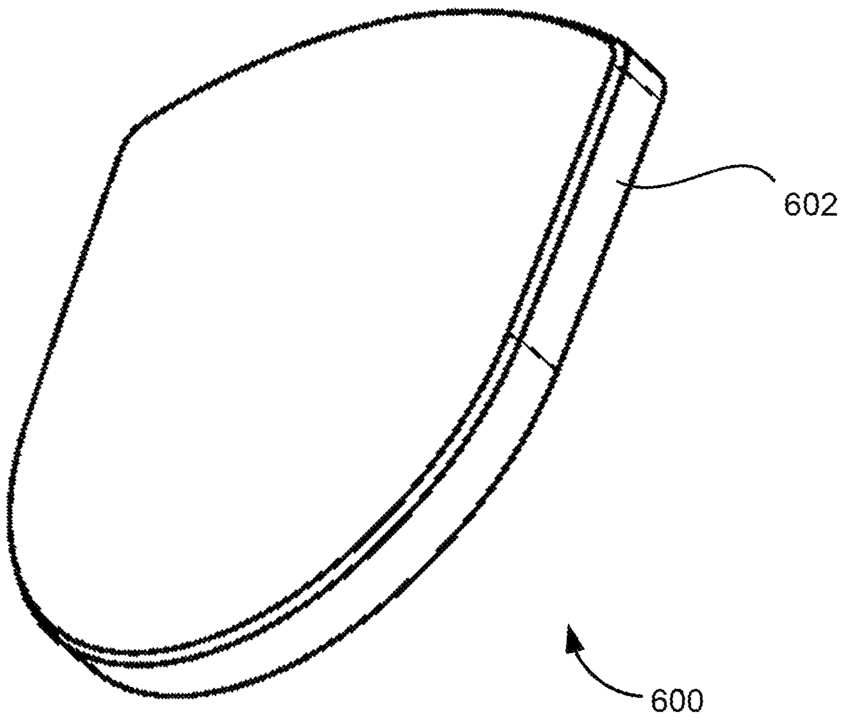
FIG. 6 is an exemplary view 600 of a back support of the apparatus for mounting musical instruments according to the embodiments of the present disclosure.

FIG. 6 is an exemplary view 600 of a back support 602 of the apparatus for mounting musical instruments according to the embodiments of the present disclosure. The back support 602 may be fastened on the front side of the bridge member

202 using a set of fasteners. Alternatively, the back support 602 may be glued onto the front side of the bridge member 202.

Figure 7:
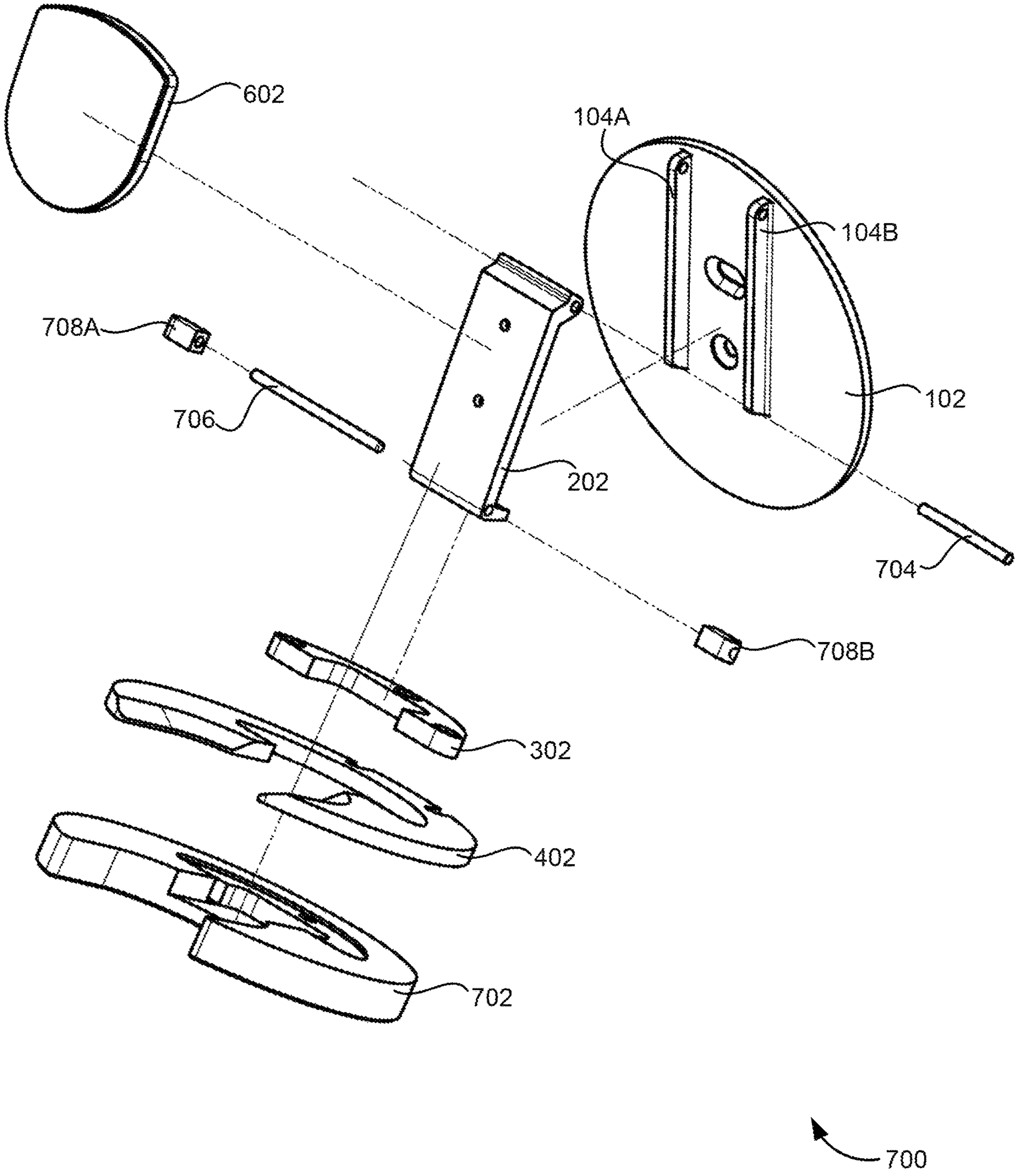
FIG. 7 is an exemplary exploded view 700 of the components of the apparatus depicting various connection points of the apparatus for mounting musical instruments according to the embodiments of the present disclosure.

FIG. 7 is an exemplary exploded view 700 of the components of the apparatus depicting various connection points of the apparatus for mounting musical instruments according to the embodiments of the present disclosure. Dotted lines represent connections and connecting points of various components of the apparatus as understood by a person skilled in the art and as explained in this document.

Herein, the backplate 102 may pivotably connect to the bridge member 202 at its top portion via a first axle 704 and a pair of elevated ridges 104A and 104B. The first axle 704 passes through the openings provided in the top side of the bridge member 202 and the openings provided on the pair of elevated ridges 104A and 104B. The rotational movement of the bridge member 202 is restricted to an axis according to the pivotable connection. The bottom side of the bridge member 202 is pivotably connected to the bracket 302 using a second axle 706 and a pair of bearings 708A and 708B. Back support 602 may be fixed onto the front side of the bridge member 202. The bracket 302 is encased into the opening provided on the cushioning member 402 which is further covered externally by the encasing 702. The bracket 302, the cushioning member 402 and the encasing 702 move and rotate together according to the movement of the bracket 302.

Figure 8:
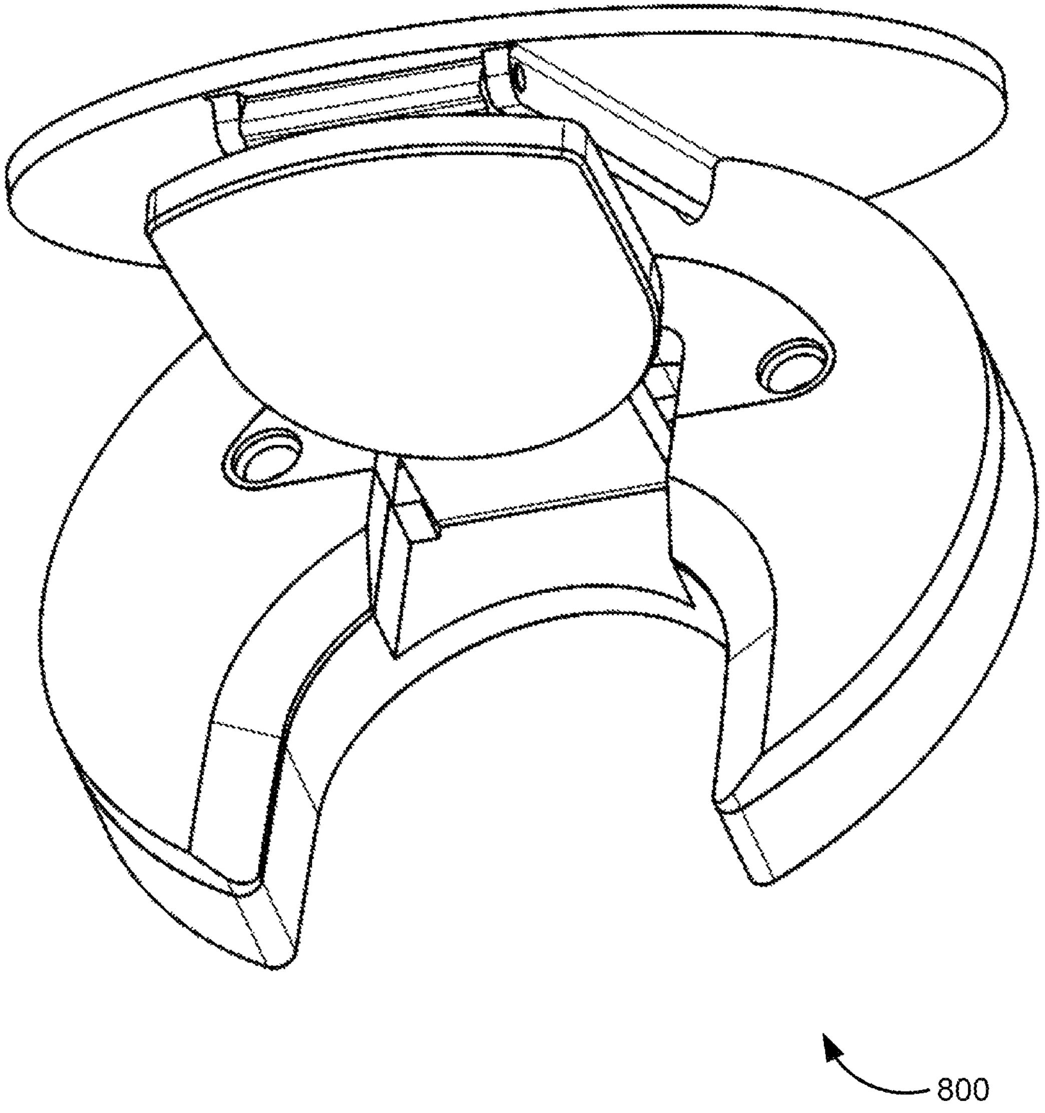
FIG. 8 and FIG. 9 are exemplary perspective views 800 and 900 of the apparatus for mounting musical instruments according to the embodiments of the present disclosure.
Figure 9:
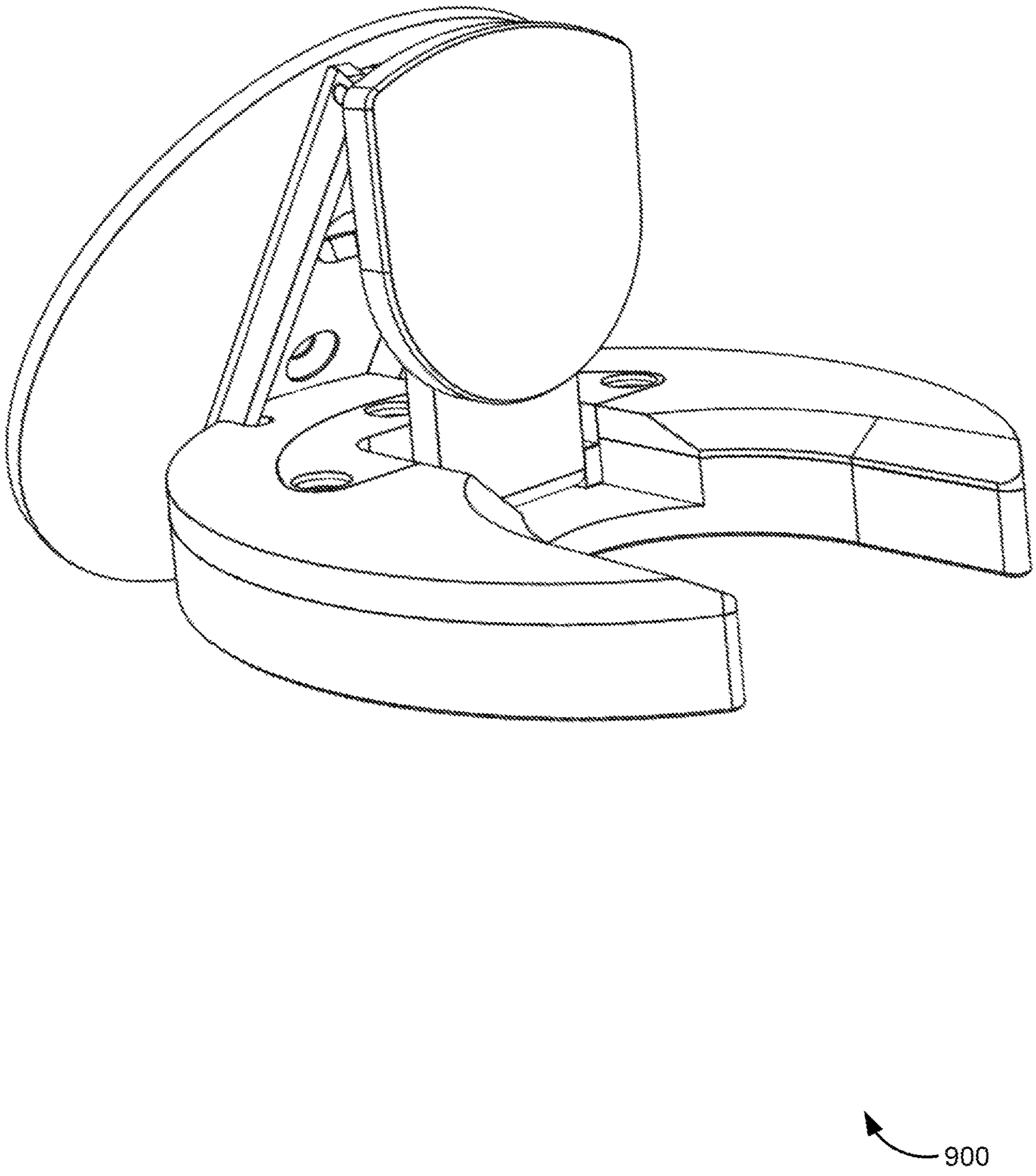

FIGS. 8 and 9 are exemplary perspective views 800 and 900 of the apparatus for mounting musical instruments according to the embodiments of the present disclosure. Herein, the apparatus is in an extended configuration wherein the U-shaped opening may be used for mounting musical instruments by their neck. The contact points of the musical instrument may include the rear portion of the neck which may touch the back support 602 of the apparatus and the rear side of the cushioning member 402. The back support 602 and the cushioning member 402 may be manufactured using soft materials to avoid wear and tear when the musical instrument is mounted on the apparatus. In one example, the back support may be manufactured using wood or soft plastic. The cushioning member 402 may be manufactured using cork, soft plastic, or other related materials. The cushioning member 402 may be designed in such a way that the edges along the U-shaped opening are slightly curved as depicted in the figures. This design makes sure that the edges are not sharp thereby avoiding wear and tear to the musical instrument.

Figure 10:
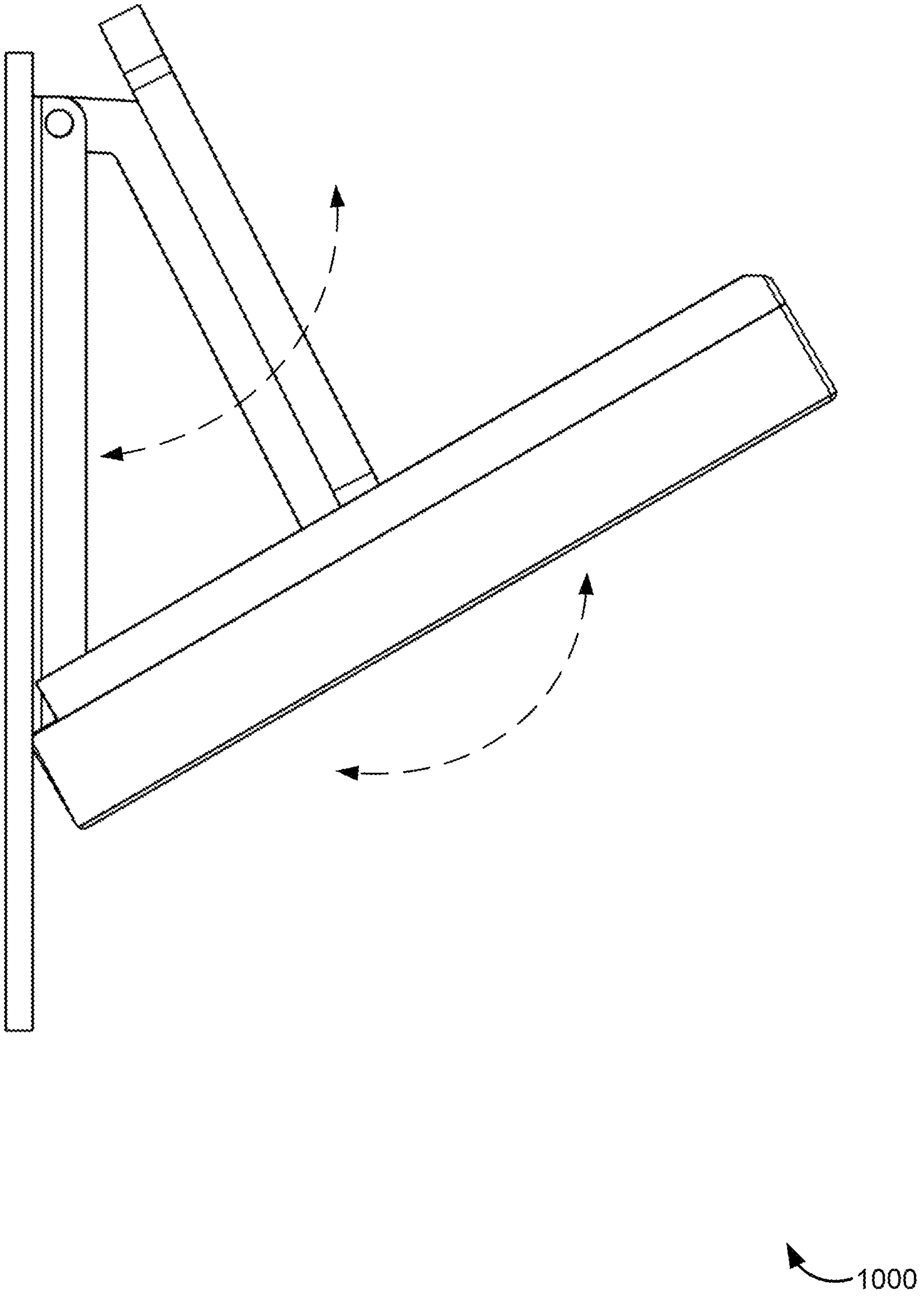
FIG. 10 is an exemplary side view 1000 of the apparatus for mounting musical instruments according to the embodiments of the present disclosure.

FIG. 10 is an exemplary side view 1000 of the apparatus for mounting musical instruments according to the embodiments of the present disclosure. The dotted arrows depict the angular movement of the components of the apparatus when extended and retracted. The bottom portion of the cushioning member 402 translates vertically along the elevated guides of the backplate 102 when the bracket and connected components rotate. The angle between the backplate and the cushioning member may preferably be between 60° and 90° when the apparatus is in an extended configuration for mounting musical instruments securely. Preferably, the angle is lesser than or equal to 90° to avoid the musical instrument from sliding-off the apparatus.

Figure 11:
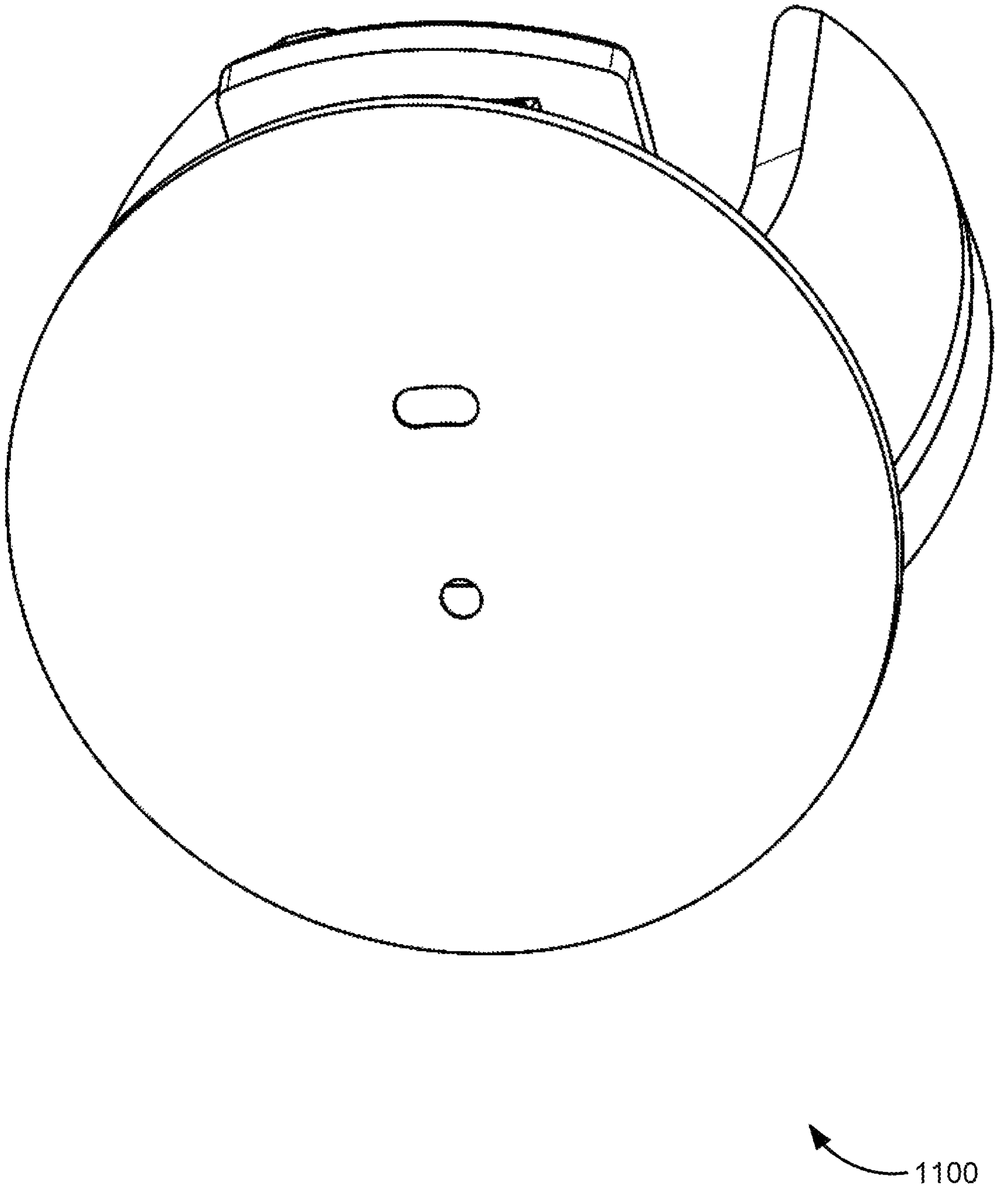
FIG. 11 is an exemplary view 1100 of the rear side of the backplate of the apparatus for mounting musical instruments according to the embodiments of the present disclosure.

FIG. 11 is an exemplary view 1100 of the rear side of the backplate of the apparatus for mounting musical instruments according to the embodiments of the present disclosure. The rear side of the backplate 202 may be plain and may be attached to walls or other related surfaces using a set of fasteners.

Figure 12:
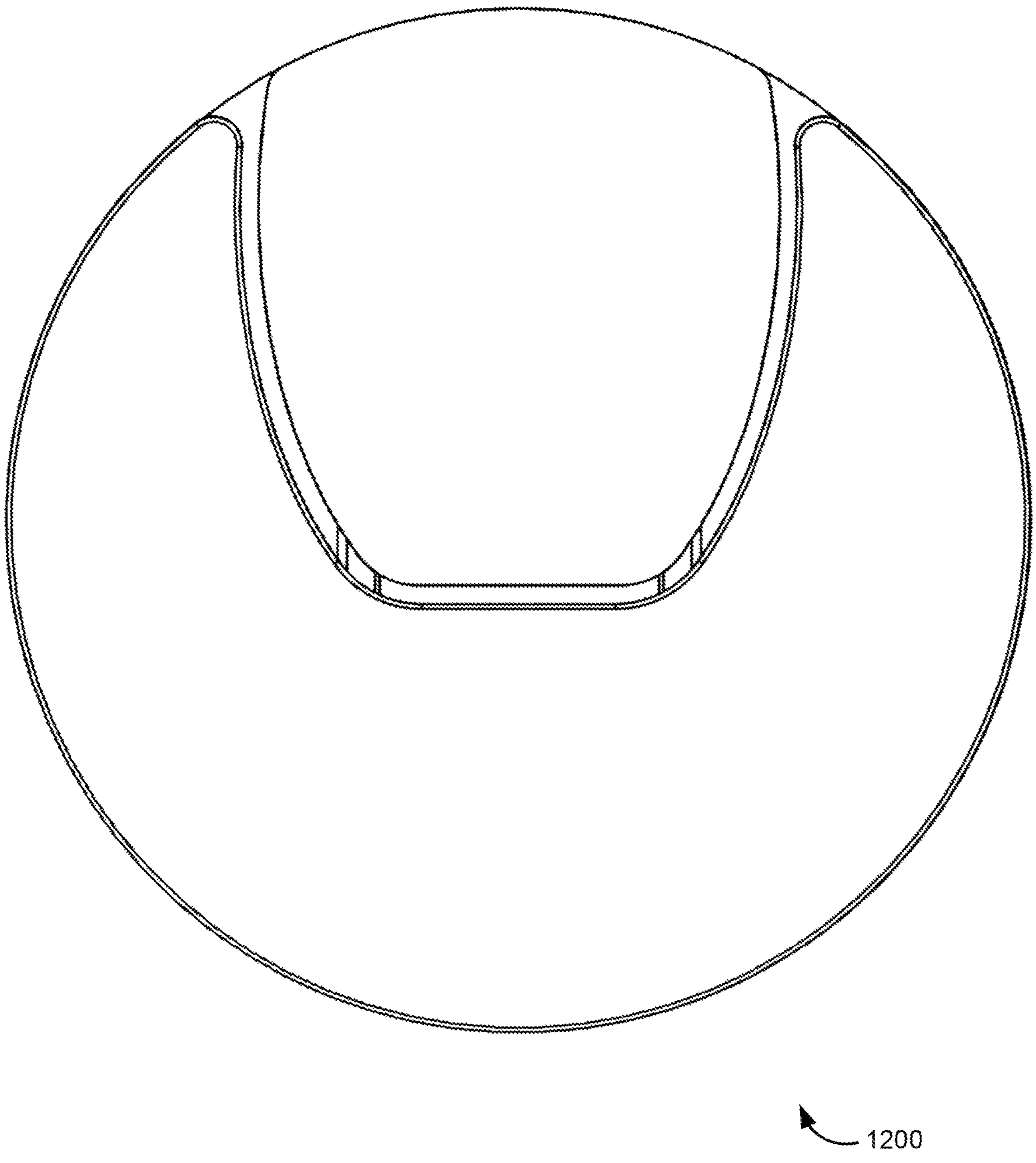
FIG. 12 is an exemplary front view 1200 of the apparatus for mounting musical instruments in a retracted configuration according to the embodiments of the present disclosure.
Figure 13:
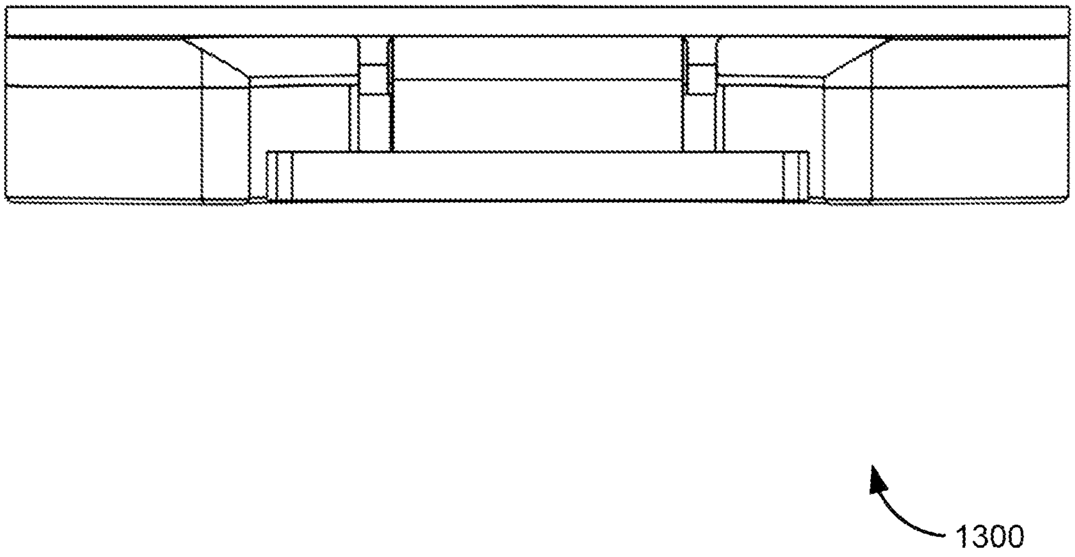
FIG. 13 is an exemplary top view 1300 of the apparatus for mounting musical instruments in a retracted configuration according to the embodiments of the present disclosure.
Figure 14:
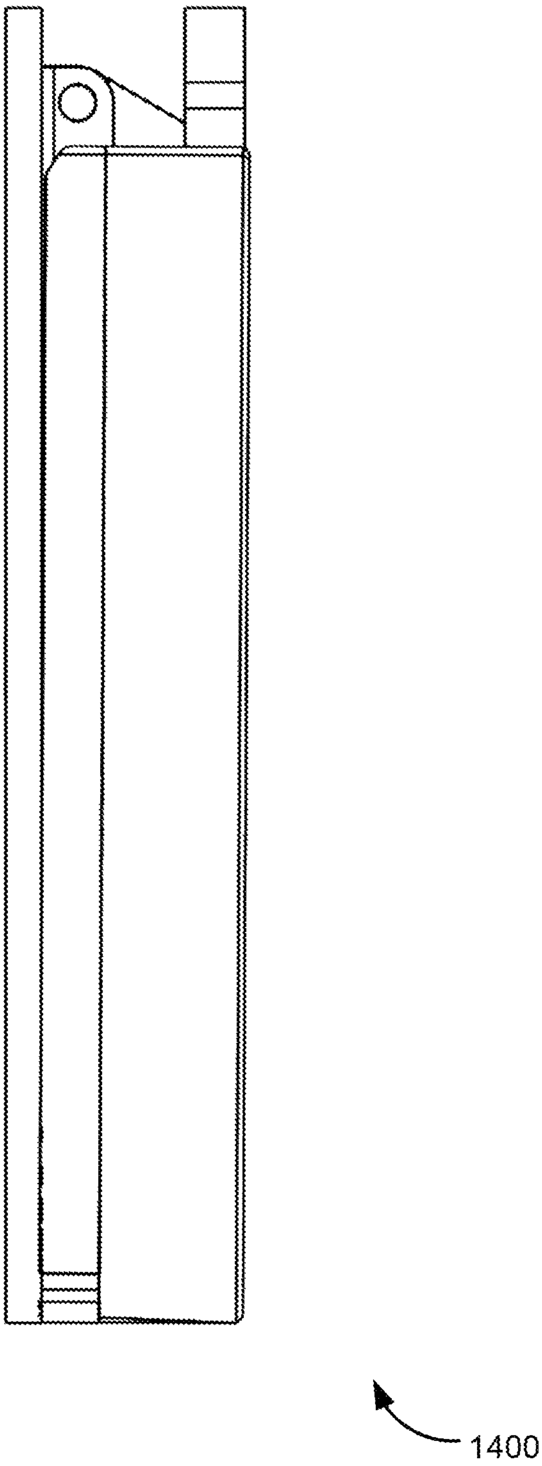
FIG. 14 is an exemplary side view 1400 of the apparatus for mounting musical instruments in a retracted configuration according to the embodiments of the present disclosure.

FIG. 12 is an exemplary front view 1200 of the apparatus for mounting musical instruments in a retracted configuration according to the embodiments of the present disclosure. FIG. 13 is an exemplary top view 1300 of the apparatus for mounting musical instruments in a retracted configuration according to the embodiments of the present disclosure. FIG. 14 is an exemplary side view 1400 of the apparatus for mounting musical instruments in a retracted configuration according to the embodiments of the present disclosure. As depicted in FIGS. 12-14, the apparatus may be completely retracted when not in use. In this configuration the backplate 102, the bridge member 202, the back support 602, the bracket 302, the cushioning member 402, and the encasing 702 are positioned parallelly and in a sandwiched configuration. The components are parallel to each other along a single plane thereby occupying very less space. This configuration may also be aesthetically pleasing when the apparatus is not in use. Furthermore, the retracted configuration avoids any accidents that may be caused by the extended form factor and further avoids wear and tear to the apparatus itself.

The apparatus may be manufactured using a wide variety of materials depending upon the use case and the nature of the musical instrument that is to be mounted. In a preferable embodiment, the backplate, the bridge member, and the bracket may be manufactured using metal-based materials. Metals such as aluminium, steel, iron, copper, or other related metals and alloys may be used. Alternatively, plastics, thermoplastic polymers, or other related materials may also be used. The back support and the encasing may be manufactured using soft materials to avoid wear and tear to the musical instruments. In one example, the back support and the encasing may be manufactured using wood for providing a polished finish. Alternatively, soft plastics, thermoplastic polymers, or other related materials may also be used.

Similarly, the cushioning member may be manufactured preferably using cork. The cushioning member directly receives most of the weight of the musical instrument when the instrument is mounted. Hence, a soft material which is relatively flexible may be preferred. Apart from cork, rubber, silicone, or soft plastics may also be used for manufacturing the cushioning member 402.

Furthermore, the thickness of various components of the apparatus such as the bridge 202, back support 602, cushioning member 402, bracket 302, and encasing 702 may be varied depending on the requirement of a user and the weight of the instrument that is to be mounted on the apparatus. The cut-outs provided for mounting the neck of the musical instruments may also be varied to support musical instruments of different neck types and sizes. Instruments such as violin, ukulele, viola, cello, and the like may also be supported by the apparatus by varying the dimensions of the cut-outs as understood by a person skilled in the art.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications, and changes may be made without departing from the spirit of the present solution. All the features disclosed in this specification (including any accompanying drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or an appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter.

What is claimed is:

1. An apparatus for mounting a musical instrument with an elongated neck, comprising:

a backplate configured to be fastened to a wall using a set of fasteners, wherein a front portion of the backplate comprises a pair of vertically positioned elevated guides that are parallel to each other;

a bridge member having a top end and a bottom end, wherein the top end is pivotably connected to the pair of vertically positioned elevated guides of the backplate;

a bracket pivotably connected to the bottom end of the bridge member;

a cushioning member having a U-shaped opening configured to receive the elongated neck of the musical instrument, wherein the cushioning member encases the bracket, and wherein a bottom portion of the cushioning member comprises a pair of grooves that abut the pair of vertically positioned elevated guides of the backplate and allow the bottom portion of the cushioning member to translate vertically in accordance with a movement of the bracket and a movement of the bridge member;

a back support connected to a front side of the bridge member; and an encasing having a U-shaped opening and connected to a front portion of the cushioning member, wherein the U-shaped opening of the cushioning member and the U-shaped opening of the encasing are configured to receive the elongated neck of the musical instrument.

2. The apparatus of claim 1, wherein the backplate, the bridge member, and the bracket are metal based.

3. The apparatus of claim 1, wherein the cushioning member is cork based.

4. The apparatus of claim 1, wherein the back support and the encasing are wood based.

5. The apparatus of claim 1, wherein a first, axle pivotably connects the top end of the bridge member to the pair of vertically positioned elevated guides.

6. The apparatus of claim 5, wherein a second axle pivotably connects the bottom end of the bridge member to the bracket.

7. The apparatus of claim 1, wherein the backplate is circular shaped.

8. The apparatus of claim 1, wherein the backplate is configured to be fastened to the wall using at least one of screws, bolts, nuts, rivets, or clasps.

9. The apparatus of claim 1, wherein the back support connected to the front side of the bridge member fits into the U-shaped opening of the cushioning member and the U-shaped opening of the encasing when the apparatus is retracted to a resting configuration.

10. The apparatus of claim 1, wherein an angle between the backplate and the cushioning member ranges between 60° and 90° when the apparatus is in an extended configuration for hanging the musical instrument.

11. The apparatus of claim 1, wherein the back support is configured to protect a rear side of the elongated neck of the musical instrument mounted on the apparatus from wear and tear.

12. The apparatus of claim 1, wherein the cushioning member is configured to protect the musical instrument from wear and tear when the musical instrument is mounted on the apparatus.

* * * * *